Jan. 8, 1957   H. J. NICHOLS   2,776,719
CONTROLLABLE REVERSIBLE PITCH PROPELLER SYSTEM
Filed Oct. 2, 1953
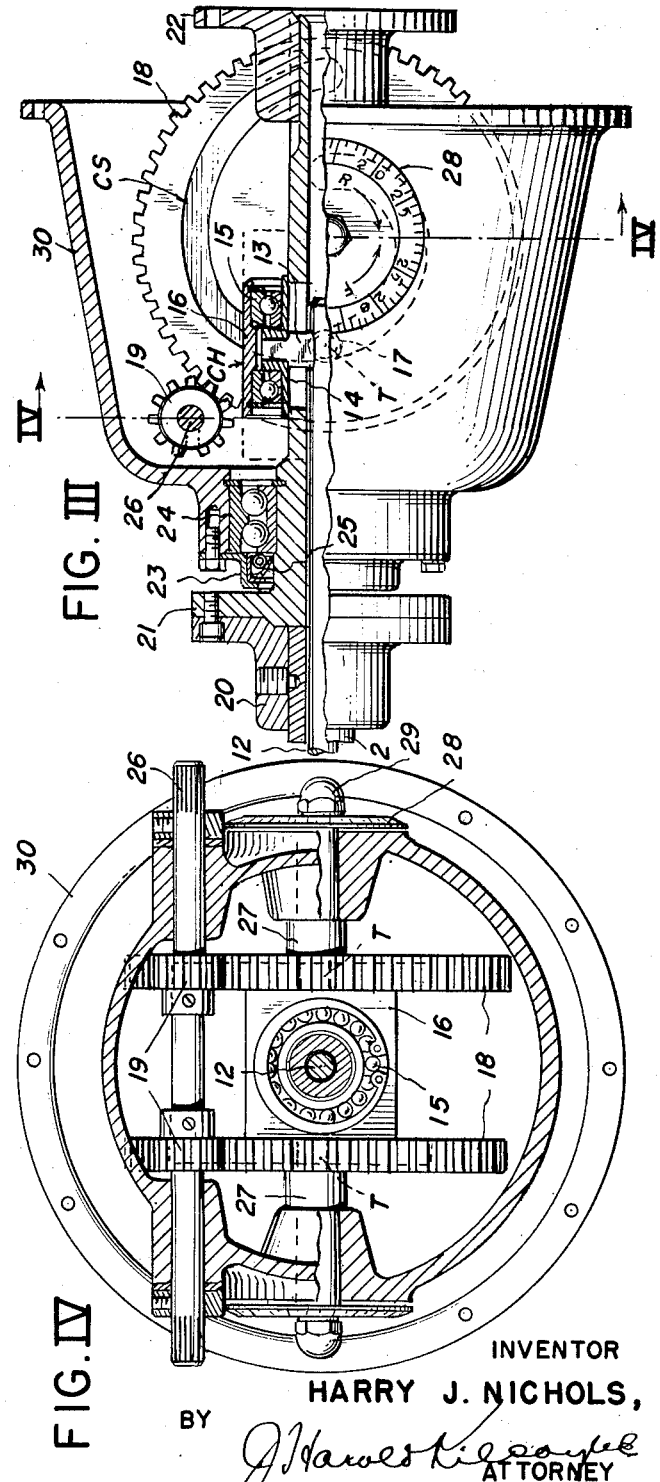
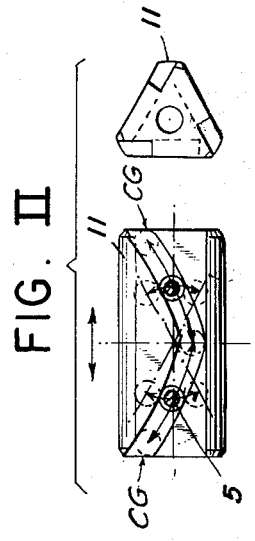
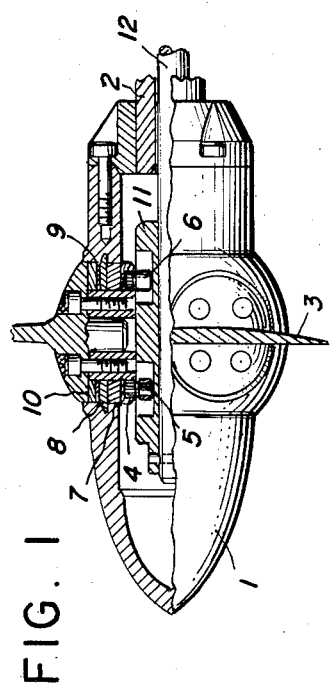
INVENTOR
HARRY J. NICHOLS,
BY
ATTORNEY

# United States Patent Office 2,776,719
Patented Jan. 8, 1957

2,776,719

CONTROLLABLE REVERSIBLE PITCH PROPELLER SYSTEM

Harry J. Nichols, Point Pleasant, N. J.

Application October 2, 1953, Serial No. 383,887

4 Claims. (Cl. 170—160.47)

This invention relates to controllable reversible pitch propeller systems and particularly to improvements in such systems specially adapted for motor boats having inboard motors of considerable power, the present application being a continuation of my prior application Serial No. 52,216, filed October 1, 1948, now abandoned.

The prior art discloses that many inventors have attemped to device manually operable controllable reversible pitch propellers for motor boats, but very few of these have met with any measure of success in practice. At the present time, the few such propellers in use are restricted to boats with engines having a power of twenty-five horse-power or less. Among the main reasons for the lack of success of prior art inventions, the following may be cited.

The high shaft and boat speeds now prevalent make it necessary, in order to avoid loss of propulsion efficiency, to use a propeller having a compact hub of relatively small diameter, thus imposing rigid space limitations on the blade mountings and the movement in the hub for turning the blades about their axes. In direct conflict with this necessity, the blade turning movement must have a large angular range in order to reverse the pitch of the propeller. As a consequence, virtually all blade turning movements disclosed by the prior art are ruled out because they are not sufficiently compact, or else cannot provide the required angular range.

When a controllable pitch propeller is used to stop and reverse the motion of a powerful motor boat while running at top speed, powerful reaction forces tend to turn the blades about their axes, and unless suitable counter-measures are provided, these forces may cause the manual operating member to "kick-back" suddenly, with consequent danger of loss of control or injury to the operator. Obviously, locking the manual operating member in any set position will not overcome this danger, because such member would have to be unlocked during operation. Furthermore, "free" or unlocked controls are essential if manual operation is to be exercised from a plurality of locations, as is usually required in practice. To avoid the possibility of any such accident, special features must therefore be introduced to assure that the blade actuating mechanism is "self-locking" in any position in which it may be set, leaving the manual operating member free at all times.

If the engine power exceeds say twenty-five horse-power and it is attempted to operate controllable pitch propellers manually, the manual effort required usually exceeds the strength of the operator, unless the pitch actuating mechanism provides a large mechanical advantage. Such mechanical advantage is not provided by ordinary simple movements such as levers, etc. Hence, for engine powers exceeding twenty-five horse-power, say, some unusual pitch actuating mechanism must be devised to meet the extraordinary requirements. The usual result is that the special mechanism devised for this purpose becomes unduly complicated and costly and hence impractical.

It is therefore the main object of the present invention to overcome the limitations and drawbacks of the prior art referred to above, and to provide a complete co-ordinated controllable reversible pitch propeller system well adapted for manual operation and characterized by simplicity, compactness, ruggedness, low cost, and utmost reliability and safety.

Another object is to provide a compact and powerful blade turning movement of adequate angular range, and adapted to be housed in a propeller hub of relatively small size, which will have a minimum of parts, which will hold the blades rigidly thereby avoiding any possibility of flutter or vibration during operation due to back-lash or elasticity, which will provide a substantial mechanical advantage, and which will be virtually self-locking in any position to which it may be set.

It is well known that the reverse gear and clutch usually employed on marine engines to reverse the rotation of the propeller shaft represents a disproportionate part of the cost, weight and size of the engine installation as compared to the engine proper, and this is particularly true in the case of inboard motorboat engines. Moreover, the clutch and reverse gear are functionally useful only a few percent of the engine operating hours, and are therefore highly uneconomical in relation to their limited functions. It is therefore yet another object of this invention to provide, as a subcombination of the system according to this invention, a transmission unit particularly adapted for attaching to marine engines of the inboard class in place of, or as a replacement for, the ordinary clutch and reverse gear unit, which transmission unit when used in the system provides self-locking operating mechanism for controlling and indicating the propeller pitch.

With these and other objects in view, as well as other advantages incident to the improved construction, the invention consists in various novel features and combinations thereof set forth in the claims with the understanding that the several necessary elements constituting the same may be varied in proportion and arrangement without departing from the nature and scope of the invention as defined in the appended claims.

To enable others skilled in the art to comprehend the underlying features of this invention that they may embody the same by suitable modifications in structure and relation to meet the various practical applications contemplated by the invention, drawings showing a preferred embodiment of the invention form part of this disclosure, and in such drawings like characters of reference denote corresponding parts in the several views in which:

Fig. I shows a longitudinal view in half-section of a propeller assembly according to the invention.

Fig. II shows top and right end views of the prismatic sliding cam forming part of the propeller assembly.

Fig. III shows a half longitudinal section of a transmission unit according to the invention.

Fig. IV shows an off-set transverse view of the assembly of Fig. III taken along the cutting line IV—IV of the prior figure.

The system of the invention as a whole comprises a propeller assembly preferably as shown in Fig. I; a transmission unit as shown in Figs. III and IV including manually operable pitch changing mechanism and a pitch indicator; and a hollow propeller shaft housing a coaxial connecting rod which operatively connect the propeller assembly to the transmission unit.

*The propeller assembly*

Referring now to Fig. I, the preferred propeller assembly consists of a one-piece hub 1 having an axial blind bore and radial open blade sockets, secured tightly on the propeller shaft 2; blades 3 mounted in the blade sockets so they can be turned each about its own axis; and a special compact mechanical movement for turning the blades axially in unison so as to vary their pitch.

The blades are provided with a circular boss, and a cylindrical root for facilitating machining and accurately centering the blades. The blades are detachably mounted for rotation in the blade sockets by means of a demountable flanged journal 4, and a combination radial and thrust bearing and fluid seal. The bearing and seal elements comprise an inner bearing-ring 7, blade retainer ring 8, cover washer 9, and combined bearing and sealing ring 10, preferably of resilient non-metallic type.

The blades are turned in unison in their bearings to change their pitch by a unique positive motion mechanical movement of unusual compactness, simplicity and power, comprising an axially slidable prismatic cam 11 mounted coaxially in the bore of the hub and having on each face oppositely inclined curved grooves CG, herein termed chevron grooves (see Fig. II) in which two diametral crank pins 5, mounted rigidly on the blade journal, are forced to turn as followers upon axial translation of cam 11, which latter is fastened rigidly on connecting rod 12 by any suitable means. The diametral crank pins are located in quadrature to the usual location of a crank pin, that is, substantially in line with the axis of the connecting rod, rather than at right angles thereto. The crank pins can thus be located close to the axis of the hub, thereby requiring a minimum of working space and enabling a hub of minimum diameter to be used.

The chevron-grooves CG apply a "torque couple" to the diametral crank pins upon axial translation of the wedge and thus turn the blades about their axes. The angle through which the blades can be turned may be 60°, which is quite adequate for reversing the pitch. The chevron-grooves CG are of special curvature so as to cause uniform angular displacement of the blades in direct proportion to the axial translation of cam 11. In mathematical terms, the curves of the chevron-grooves represent intersecting arcs of conjugate trochoids, as explained in detail in my copending application Serial No. 770,640, filed August 26, 1947 which issued as Letters Patent No. 2,675,084 dated April 13, 1954.

The crank pins are fitted with hardened roller sleeves 6 to reduce friction and wear, in the well-known manner of roller chains. The crank pins may be of replaceable type and are notched to break off clean in case of an excessive blow to a blade. This is a safety feature to prevent damage to the actuating mechanism in case of damaging accident to the propeller, and to facilitate and expedite repairs when necessary.

The multiple mechanical movement in the hub provides a mechanical advantage, that is about 2:1 according to the well-known sliding cam principle, thereby enabling a relatively light connecting rod and pitch changing mechanism to be used. The blade mechanism is rigid and the working parts can be fitted with negligible backlash. Due to this mechanical movement the blades are virtually locked in any pitch to which they are set, hence the axial force acting on the connecting rod when at rest is minor as compared to the working force, thus enabling a relatively small thrust bearing to be used.

The hub assembly as a whole is characterized by simplicity, compactness, ruggedness, ease of manufacture and assembly, and ease of replacement of the blades and working parts. The hub is provided with a supply of suitable lubricant at assembly, and requires no further lubricant unless dismantled.

Due to the compactness of the hub assembly, the propeller blades can be located in normal relation to the hull, rudder, and strut or stern bearing. Due to the streamline form of the hub assembly, there is no loss of propulsion efficiency, despite the necessarily somewhat larger diameter and length of the hub. Due to the efficient blade turning movement, the connecting rod can be of such small diameter that no increase in the normal diameter of the propeller shaft is necessary, and a relatively small transmission unit can be used.

*The transmission unit*

Referring to Figs. III and IV, the transmission unit has a basic structure comprising a light compact one-piece housing 30 adapted to be fastened rigidly to the engine housing in place of the usual reverse gear housing. In the housing is mounted a flanged hollow tail shaft 21 provided with a ball thrust-bearing 24 and a slidable splined coupling 22 for making a driving connection to the engine (not shown), and pitch changing mechanism operatively mounted on the tail shaft.

The propeller shaft is preferably coupled to the tail shaft by an ordinary demountable flange coupling 20. The tail shaft 21 is provided with an outboard oil seal 25, of commercial type, this seal and the ball thrust bearing being secured in a demountable manner by retainer cup 23 and suitable retainer rings of commercial type. The connecting rod 12 extends coaxially through the propeller shaft and partly into the tail shaft, and is provided at the in-board end with a demountable cross-tenon 13 having projecting ends arranged to slide axially in guide slots formed radially in the walls of the tail shaft. A special cross-head assembly CH is mounted slidably on the tail shaft and connected operatively to the connecting rod as follows: The projecting ends of the cross-tenon fit into notches provided in the two halves of thrust sleeve 14, mounted slidably on the tail shaft. A hollow trunnion block 16, having a pair of diametral trunnions T, is mounted rotatably but non-slidably coaxially around the thrust sleeve by a pair of ball thrust bearings 15 held in place by retainer rings of commercial type.

The cross-head assembly CH is moved axially for purposes of changing the pitch by an efficient self-locking anti-kickback mechanical movement of rotary cam and follower type comprising a pair of positive motion face cams 18 each having a spiral cam-slot CS formed in the inward face in which one of the trunnions T is constrained to move as a follower. The trunnions are preferably provided with roller sleeves 17 in the same manner as the crank pins. The face cams are independently and rotatably mounted on opposite sides of the tail shaft by means of individual stud shafts 27 journaled in the housing and extending therethrough. Means is therefore required to displace the face cams angularly in unison. The preferred means shown consists of providing the cams with external gear teeth and providing two pinions 19 in mesh with the external gears of the cams and mounted fast on a cross-shaft 26 journaled in the housing. This also provides reduction gearing for driving the face cams.

This mechanism provides a large compounded mechanical advantage due to the cam action of the cam-slots on the rollers of the trunnions, and further due to the reduction ratio of the pinion-and-gear combination. It should also be noted that the pin and cam slot movement is self-locking, because the curvature of the cam-slots at any point is virtually the same as the arc of a circle struck from the axis of rotation. Thus the self-locking characteristics and mechanical advantages of the mechanical movements in the hub and transmission units respectively are compounded, and the actuating mechanism as a whole is positively self-locking not only at any position to which it may be set but also under all operating conditions. Moreover, the operating mechanism is highly efficient, thus facilitating manual operation of more powerful propellers than has heretofore been feasible.

The cross-shaft 26 is adapted to be fit at either or both ends with an operating member, such as a crank handle or hand wheel, for local manual control. For remote control installations, the cross-shaft can be turned by a remote operating member and a simple rotary transmission, such as a flexible shaft, or other commercial remote control devices, according to the particular requirements.

Pitch indicator

The stud shafts 27 are each provided with a pitch indicator dial 28 fastened rigidly to the outboard end thereof by acorn nuts 29, as shown, or by other suitable means. Due to the positive movements of the pitch actuating mechanism and the virtual absence of back-lash, the angular position of the dials accurately measure the pitch angle. The dials are suitably graduated to indicate the pitch angle, as shown, a stationary index mark being provided preferably on the housing 30 adjacent the top of each dial. It should be noted that face cams 18 rotate only one revolution or less for the entire pitch range, hence no ambiguity as to the pitch setting is introduced by the simple dial and index mark arrangement shown. Further, since the usual pitch range is 60° or less and the pitch and dial movements are uniformly proportional, the graduations on the dial can be spaced at a fixed angular multiplier ratio, thus facilitating easy and accurate calibration and reading of the pitch angle. Thus, it is evident that the pitch indicator is characterized by its simplicity, accuracy, and reliability.

Operation

The operating parts are shown in mid position and the blades in neutral position; however, in practice, more ahead than astern pitch is usually provided for, in accordance with the propulsion requirements. The operation of the pitch changing mechanism is as follows:

In neutral pitch, preferably indicated on the dials as the "N" position, the blades are disposed at substantially zero effective pitch, so that way is not put on the vessel when the engine is started or running idle. To get underway, the operating member is turned so as to move the dial towards the forward or "F" position, thereby turning the cross-shaft and gears and causing the cams to slide the trunnion block rearwardly. This motion is transmitted via the thrust bearings, slider sleeve, and cross-tenon to the connecting rod, which latter traverses the sliding cam 11 axially in the bore of the hub. The chevron-grooves CG in cam 11 impart a torque couple to the crank-pins 5, which turn the blades 3 in unison to increase their pitch in a positive direction. The vessel is then driven ahead by the engine in the usual manner.

To reduce or reverse the pitch, thereby to slow-down, stop, or reverse the motion of the vessel, the operating member is turned to move the dial towards the reverse or "R" position, thus moving the various links of the operating mechanism as before described in the reverse direction.

By reason of the positive mechanical connection of the links of the operating mechanism, the angular position of the dials always represent directly the pitch angle. Accordingly, the pitch can be set to any desired intermediate pitch merely by properly positioning the operating member. Due to the mechanical advantage and efficiency of the novel operating mechanism, the reaction force on the pitch control member during pitch change is greatly diminished, with the practical result that the mechanism of the invention can be used to provide manual control of the pitch of propellers directly driven by high speed engines of considerable power, say up to a hundred and fifty horse-power. Furthermore, due to the self-locking characteristics, the recoil force at the operating member while the pitch is being changed or set is negligible, eliminating all danger of loss of control or injury to the operator. Thus, the operating mechanism provides novel means for preventing kick-back of the manual control means.

It is thought evident without further discussion that the invention provides a thoroughly practical and reliable controllable reversible pitch propeller system well adapted for manual operation and having outstanding advantages over the prior art; as well as a novel and effective transmission unit well adapted to function as the linking mechanism for controlling and reversing the propeller pitch, and also to indicate propeller pitch.

While I have described my invention in detail in its present preferred embodiment, it will be obvious to those skilled in the art, after understanding my invention, that various changes and modifications may be made therein without departing from the spirit or scope thereof. The appended claims are therefore intended to cover all such modifications and changes.

I claim as my invention:

1. A controllable reversible pitch propeller system for motor boats comprising, in combination: a tubular propeller shaft; a propeller assembly fastened tightly to the outboard end of said propeller shaft, said assembly including a hollow hub with propeller blades journaled therein so as to be axially rotatable, and a sliding cam movement mounted within said hub for applying a torque couple to each of said blades so as to turn them axially in unison for the purpose of varying and reversing their pitch; an axially translatable connecting rod for operating said cam movement fastened rigidly thereto and extending coaxially within and through said propeller shaft; and a transmission unit located at the inboard end of said propeller shaft comprising a box-like housing, a power transmission shaft journaled in said housing in axial alignment with said propeller shaft, means for coupling said power transmission shaft to said propeller shaft, a cross-head assembly slidably mounted on said power transmission shaft and operatively connected to translate said connecting rod, and mechanism for sliding said cross-head assembly including at least one rotary positive motion face cam operatively connected to slide said cross-head assembly axially along said power transmission shaft upon limited angular displacement of said face cam.

2. A controllable pitch marine propeller system for motor boats comprising, in combination: a tubular propeller shaft; a propeller assembly fastened tightly to the outboard end of said propeller shaft including a hollow hub mounting variable pitch blades having a pair of diametral crank pins and a mechanical movement mounted within said hub including a slidable cam member having grooves operatively connected to said crank pins so as to vary the pitch of said blades; an axially translatable connecting rod operatively connected to said cam member and extending coaxially in the bore of said propeller shaft; and means for translating said connecting rod for purposes of varying the pitch of said blades including a cross-head assembly having diametral pin members operatively connected to translate said connecting rod, and a positive motion movement for translating said cross-head assembly axially with respect to said propeller shaft including a pair of rotatable face cams each having a cam-slot in the form of a single revolution spiral operatively engaged by an individual pin member carried by said cross-head assembly, and means for displacing said face cams angularly in unison.

3. In a controllable reversible pitch marine propeller system, in combination: a tubular propeller shaft; a propeller assembly fastened tightly to the outboard end of said propeller shaft including a hollow hub having variable pitch blades journaled therein and a mechanical movement operatively mounted therein for applying a torque couple to each of said blades so as to change their pitch, an axially translatable connecting rod operatively connected to said mechanical movement and extending coaxially through the bore of said propeller shaft; and means for translating said connecting rod axially including a cross-head assembly mounted coaxially with respect to said propeller shaft and said connecting rod and operatively connected to translate said connecting rod, said assembly having at least one projecting follower pin, a cam-slot and pin movement including a rotatable positive motion face cam having a spiral cam slot operatively arranged so as to engage said follower pin, means for rotating said cam to translate said cross-head assembly and thus to control and reverse the pitch of said propeller, and means operatively associated with said face cam for indicating the pitch of said blades.

4. In a controllable reversible-pitch marine propeller system, the combination comprising: a hollow propeller drive shaft; a variable pitch propeller fixed on the outboard end thereof including a hollow hub having radially disposed blades journaled therein and a mechanical movement mounted within said hub for turning said blades each about its own axis; an axially translatable connecting rod drivingly connected to said movement and extending coaxially in said shaft; a cross-head assembly having a pair of outwardly projecting diametral pins mounted axially slidable upon said shaft and connected so as to translate said rod; and self-locking anti-kickback mechanism for reciprocating said cross-head assembly comprising a reversible rotatable pitch controlling member, a pair of face-cams each rotatably mounted on opposite sides of and facing said cross-head assembly, each face-cam having a spiral groove receiving and positively driving one of said diametral pins, and reduction gear means for rotatively connecting said pitch-controlling member to said face cams; whereby said cross-head can be freely translated along said shaft in either direction according to the rotation of said pitch controlling member, while said cross-head is continuously locked against displacement by reaction of said blades.

References Cited in the file of this patent

UNITED STATES PATENTS

| | | |
|---|---|---|
| 478,814 | Paine | July 12, 1892 |
| 1,840,148 | Berry | Jan. 5, 1932 |
| 1,890,932 | Briner | Dec. 13, 1932 |
| 2,480,521 | Thompson | Aug. 30, 1949 |
| 2,670,805 | Nichols | Mar. 2, 1954 |

FOREIGN PATENTS

| | | |
|---|---|---|
| 7,666 | Sweden | May 4, 1896 |